United States Patent [19]

Giordano et al.

[11] Patent Number: 5,523,343

[45] Date of Patent: Jun. 4, 1996

[54] HOT MELT ADHESIVE COMPOSITIONS FOR SPECIAL APPLICATIONS

[75] Inventors: Sergio Giordano, Peschiera Borromeo; Alfonso Iacono, Bergamo; Antonio Riva, Milan; Gian T. Viola, Cervia, all of Italy

[73] Assignee: Enichem Elastomeri S.r.l., Milan, Italy

[21] Appl. No.: 332,785

[22] Filed: Nov. 1, 1994

[30] Foreign Application Priority Data

Nov. 26, 1993 [IT] Italy ................................. MI93A2495

[51] Int. Cl.$^6$ ........................................................ C08L 53/02
[52] U.S. Cl. ............................ 524/505; 524/274; 525/89; 525/92 D; 525/97; 525/98; 525/99
[58] Field of Search ..................................... 524/274, 505; 525/89, 92, 97, 98, 99

[56] References Cited

U.S. PATENT DOCUMENTS

| 3,950,291 | 4/1976 | Jurrens . | |
|---|---|---|---|
| 4,089,824 | 5/1978 | Bronstert et al. | 524/274 |
| 4,097,550 | 6/1978 | Haaf et al. | 524/505 |
| 4,104,326 | 8/1978 | Fodor | 525/89 |
| 4,409,357 | 10/1983 | Milkovich | 524/505 |
| 4,835,200 | 5/1989 | St. Clair | 524/505 |
| 4,904,725 | 2/1990 | Himes | 524/505 |

FOREIGN PATENT DOCUMENTS

| A-0368141 | 5/1990 | European Pat. Off. . |
| WO-A-93 17079 | 9/1993 | WIPO . |
| WO-A-93 24547 | 12/1993 | WIPO . |

*Primary Examiner*—Edward J. Cain
*Attorney, Agent, or Firm*—Oblon, Spivak, McClelland, Maier & Neustadt

[57] ABSTRACT

Pressure-sensitive "hot melt" adhesive compositions based on styrene-butadiene radial block copolymers, styrene-isoprene linear and/or radial block copolymers and plasticizing oils, are characterized in that they maintain low tack values (peeling, quick Stick) although having a good balance of properties normally required.

3 Claims, No Drawings

HOT MELT ADHESIVE COMPOSITIONS FOR SPECIAL APPLICATIONS

The present invention relates to a self-adhesive composition basically based on: a) a radial block copolymer of butandiene with styrene, b) a linear or radial, block copolymer of isoprene with styrene; c) at least one adhesion-promoting resin as well as at least one plasticizing oil and antioxidants.

The mixture has excellent self-adhesive characteristics, similar to those of a mixture obtained with natural rubber partially cross-linked mixed with adhesion-promoting resins. It can be used for the production of adhesive tapes, labels, self-adhesive items for sanitary use (for example sanitary towels). It can be favourably compared to mixtures based on natural rubber which however have lower technological properties (for example cohesion), and are suitable for sophisticated use which requires a good balance of cohesive and adhesive properties; these properties are evaluated in accordance with the following tests:

Rolling ball tack (ASTM D3121)
Probe tack (ASTM D2979/71)
180° peel adhesion test; PSTC 1
Quick Stick; PSTC 5
Shear adhesion (Holding Power); modified PSTC 7
Aging stability.

Among patent documentation in the known art which describes adhesive compositions based on ABA linear block copolymers, the following can be quoted: patent application WO 91/02039 and patents U.S. Pat. Nos. 3,239,478; 3,784,587; 3,427,269. Among patent documentation in the known art which describes adhesive compositions based on radial block copolymers of the type $(AB)_nBA$, 4,096,203 and IT93/A00879 can be quoted.

Hot-melt adhesive compositions based on styrene block copolymers are also particularly used when adhesion with not very (or totally non) polar substrates is required, such as polyethylene and the like and in applications where the product is subjected to mechanical and/or elastic stress. This is the case with adhesives for nappies and sanitary towels.

Adhesive formulations based on a styrene-butadiene block copolymer very often have technological problems deriving from their limited tack, whereas on the other hand adhesive formulations based on styrene-isoprene block copolymers have excessive tack, which creates great difficulty in unrolling the adhesive tape.

High tack also causes annoying and excessive noise during the high-speed industrial operation of spool cutting. High noise values when operating in the unrolling phase for spool cutting are associated to high tack values, such as peeling and quick stick.

It has now been found, and the present invention is related thereto, that a polymeric composition based on a styrene-butadiene block copolymer with 4 radial blocks and particular characteristics specified hereunder, and containing or not containing a styrene-isoprene copolymer with linear and/or radial blocks as well as at least one adhesion-promoting resin, a plasticizing oil and antioxidants, has excellent self-adhesive characteristics, similar to those which can be obtained with natural rubber partially cross-linked and adhesion-promoting resins without having the above disadvantages; its properties enable its use in the field of production of items for sanitary use, manufacture of nappies, the production of labels and above all adhesive tapes without noise during the unrolling phase.

The present invention therefore relates to hot melt, adhesive compositions, based on radial block copolymers of styrene with butadiene and radial and/or linear block copolymers of styrene with isoprene, containing:

a) from 15 to 50% by weight of a radial block copolymer with four branches and corresponding to the general formula, $$(S-B-)_4-X \qquad (I)$$

wherein B corresponds to the polybutadiene block, S corresponds to the polystyrene block and X is the residue of a tetravalent coupling agent, b) from 0 to 35% by weight of a radial block copolymer corresponding to the general formula, $$(S-I-)_3-X \qquad (II)$$

wherein I corresponds to the polyisoprene block whereas S corresponds to the polystyrene block and X to the residue of a coupling agent, c) from 0 to 35% by weight of a linear block copolymer corresponding to the general formula, $$S-I-S \qquad (III)$$

d) from 35 to 80% by weight of at least one adhesion-promoting resin, e) from 0 to 30% by weight of at least one plasticizing oil, f) from 0 to 1% by weight of at least one antioxidant, these compositions being characterized in that, (i) the total content of polystyrene in the block copolymer (I) is less than 40% by weight,
(ii) the total content of polystyrene in the block copolymer (II) is less than 35% by weight,
(iii) the total content of polystyrene in the linear block copolymer (III) is less than 40% by weight,
(iv) the molecular weight of the polystyrene blocks in copolymer (I) is less than 30,000, that of the polystyrene blocks in copolymer (II) is less than 32,000 whereas that of the polystyrene blocks in copolymer (III) is less than 36,000,
(v) the molecular weight of the radial block copolymer (I) $(S-B-)_4-X$ is between 180,000 and 260,000,
(vi) the molecular weight of the radial block copolymer (II) $(S-I-)3-X$ is between 120,000 and 270,000,
(vii) the molecular weight of the linear block copolymer SIS (III) is between 70,000 and 180,000.

A preferred embodiment of the present invention relates to hot melt adhesive compositions based on a radial block copolymer (I), containing:

a) 40% by weight of a radial block copolymer with four branches and corresponding to the general formula, $$(S-B-)_4-X \qquad (I)$$

wherein B, S and X have the meaning defined above, d) 50% by weight of at least one adhesion-promoting resin, e) 9.6% by weight of at least one plasticizing oil, f) 0.4% by weight of an antioxidant, whereas they contain neither component b) nor c).

Another preferred embodiment of the present invention relates to hot melt adhesive compositions based on a radial (I) and linear (III) block copolymer, containing:

a) 20% by weight of a radial block copolymer with four branches and corresponding to the general formula, $$(S-B-)_4-X \qquad (I)$$

wherein B, S and X have the meaning defined above, c) 20% by weight of a linear block copolymer corresponding to the general formula, $$S—I—S \qquad (III)$$

wherein S and I have the meaning defined above, d) 50% by weight of at least one adhesion-promoting resin, e) 9.6% by weight of at least one plasticizing oil, f) 0.4% by weight of antioxidant, whereas they do not contain any quantity of component b).

An adhesive composition which is particularly valid for the excellent balance between physical and technological properties is that containing:

a) 32% by weight of a radial block copolymer with four branches and corresponding to the general formula $$(S—B)_4—X \qquad (I)$$

wherein B, S and X have the above meaning, b) 8% by weight of a radial block copolymer corresponding to the general formula $$(S—I)_3—X \qquad (II)$$

wherein I, S and X have the above meaning, d) 50% by weight of at least one adhesion-promoting resin, e) 9.6% by weight of at least one plasticizing oil, f) 0.4% by weight of at least one antioxidant, whereas it does not contain any quantity of component c).

Both the copolymers with four radial blocks of general formula (I) and those with three radial blocks of general formula (II) can be prepared according to any of the preparation methods of the known art; these are described for example in U.S. Pat. No. 4.096.203, 5,118,762.

Among the various preparative methods, those using anionic polymerization in solution with organometallic compounds of lithium as initiator, are preferred.

In general, any of the solvents of the known art can be used in the preparation of the radial block copolymers of the present invention. Among the various solvents, hexane, heptane and cyclohexane are however preferred. Modifiers can also be used for the purpose of improving the reactions kinetics; among these, linear or cyclic ethers such as dimethylether, tetrahydrofuran etc. can be mentioned.

The polymerization is initiated by putting styrene in contact with an organometallic compound of lithium (RLi) wherein R is preferably an aliphatic or cycloaliphatic hydrocarbon containing from 1 to 20 carbon atoms. The quantity of catalyst, together with that of the anhydrous monomers, is selected in relation to the molecular weight of the polymer which is to be obtained in that the higher the ratio between the initiator and monomer, the smaller will be the length of the corresponding block; generally from 1.1 to 2.0 millimoles of initiator are used per 100 g of monomer. The polymerization temperature is generally kept within very wide ranges even if, in current practice, temperatures of between 20° and 100° C. are used. At the end of the polymerization of the styrene (from 20 to 40 minutes depending on the polymerization temperature), the desired quantity of anhydrous dienic monomer (isoprene or butadiene) is added and the mixture is left for exhaustive polymerization (generally from 40 to 60 minutes depending on the reaction temperature). In this way, two-block living polymeric chains are obtained, wherein S indicates the styrene block and D the dienic block, which are coupled with a coupling agent.

There is a wide variety of coupling agents which can be used. Some polyfunctional coupling agents, containing three or more reactive sites, are for example polyepoxides, polyisocyanates, polyamines, polyaldehydes, polyketones, polyanhydrides, polyesters, polychlorides.

Preferred coupling agents are polychlorosilanes and, among these, phenyltrichlorosilane, which produces a three-branch copolymer, and silicon tetrachloride, which produces a four-branch copolymer. However a considerable number of coupling agents, both tri- and tetra-valent, can be selected from those known in the art (for example those described in U.S. Pat. Nos. 3,468,972 and 3,595,941). The coupling temperature is generally maintained within the range of 80°–120° C. The final polymer is obtained after neutralization of the living chains with water or excess alcohol, coagulated with alcohol and dried by oven treatment under vacuum or calendering.

The resins, which serve to promote the adhesive properties of the composition, have a softening point which is generally lower than 140° C, preferably lower than 110° C., and consist of at least one of the following components: terpene resins, rosin acids and their esters, hydrogenated rosin esters, C5 olefin resins, particularly cyclopentadiene, resins from C9 olefinic cuts and, more generally, those resins which are prepared by the copolymerization of at least one olefinic monomer containing from 4 to 6 carbon atoms and/or piperylene, using catalysts based on aluminium trichloride or boron trifluoride, complexed and not with electrodonor compounds.

Particularly suitable are resins prepared by the polymerization of piperylene with methylbutene and which optionally contain alpha-methylstyrene and/or dicyclopentadiene.

The above resins are preferably used in a hydrogenated or saturated form to guarantee a better resistance to thermo-oxidation and a better yellowing stability.

Many resins belonging to the above groups are commercially available; they are sold under the trade-name of Escorez 5000 (Exxon), Escorez 6000 (Exxon), Piccotack 95 E, Hercolite, Regalite, Regalrez (Hercules), Westrez 2110 (Westvaco Chem. Co), Zonatac (Arizona), Wingtack (Goodyear).

As already mentioned, the resins form from 35 to 80% by weight of the adhesive compositions of the present invention. This quantity is preferably equal to or higher than that of the block copolymer or mixture of block copolymers. For example, as already specified, a hot-melt adhesive composition which has been particularly studied for the excellent balance of properties considered essential for this type of resin (see table 1), contains 32% by weight of radial block polymer having general formula (I), 8% by weight of linear block copolymer with formula (II) and 50% by weight of adhesion-promoting resin, the remaining consisting of at least one plasticizing oil.

Numerous plasticizing oils can be used as component c) in the adhesive compositions of the present invention; among these polymeric oligomers, olefinic oligomers as well as plasticizing oils of animal or vegetable origin such as glyceric esters of fatty acids, can be mentioned. These are also commercially available (e.g. Tufflo oil 6056 of Arco).

The oil or plasticizing oils form, as mentioned, from 0 to 30% by weight of the adhesive compositions of the present invention. This quantity is preferably between 5 and 20% by weight of the composition.

As an alternative to the plasticizing oil, C5 olefinic resins with a melting point lower than 40° C., can also be used, such as for example Wingtack 10 of Goodyear.

Other components can also be added to the hot melt adhesive compositions of the present invention, among which hydrocarbon waxes, used as a viscosity reducer, when an even lower viscosity than that characterizing the compositions is required, and various stabilizers or antioxidants with the purpose of inhibiting or retarding thermal and/or oxidative degradation.

Among the most commonly used stabilizers, phenolic antioxidants and also antioxidants based on phosphites can be mentioned. As an example some of these antioxidants are: pentaerythritol-tetrakis-3(3,5-ditert-butyl4-hydroxyphenyl-)propionate, 4,4'-methylenebis(4-methyl6-tert-butyl-phenol); di-n-octadecyl-3,5-di-tert-butyl-4-hydroxybenzophosphonate.

Mineral fillers ($CaCO_3$, $SiO_2$, etc.) can also be added to the above compostion as rheological modifiers.

The adhesive compositions of the present invention are prepared using any of the techniques known in the art. As a representative example of these techniques the compositions are prepared by mixing the various components in a SIGMA BLADE type mixer at temperatures of between 130° and 190° C. and preferably between 140 and 170° C. and continuing the mixing until there is a homogeneous blend. Instead of the Sigma Blade type mixer, any means capable of producing the same blend can obviously be used.

The compositions of the present invention contain, as already mentioned, both radial block polymers having four branches of the type

(S—B—)$_4$—X    (I)

and radial block polymers with three branches of the type

(S—I—)$_3$—X    (II)

and can also contain a linear block copolymer

S—I—S—    (III)

wherein B corresponds to the polybutadienic block, I to the polyisoprenic block, whereas S corresponds to the polystyrenic block, and they are obtained by anionic copolymerization in solution in a hydrocarbon solvent.

The styrene was put in contact with the catalyst and, when it had reacted quantitatively, the living polymer was put in contact with the dienic monomer. At this stage the living polymer if of type (I) or (II), was coupled with a coupling agent and subsequently deactivated with a suitable deactivator, for example water, whereas if it was type (II) the reaction was continued after the addition of a suitable quantity of styrene and then plugged with a plugging agent (alcohol, water etc).

In the tests carried out in the following examples, we attempted to use a coupling agent which was able to obtain a high coupling efficiency which would otherwise negatively influence the adhesive properties (the coupling efficiency is defined as the number of molecules of coupled polymer divided by the number of molecules of coupled polymer plus the number of molecules of non-coupled polymer). The coupling efficiency can be theoretically determined from the stoichiometric quantity of coupling agent required for completing the coupling and can be determined by gel-permeation chromatography (GPC) analysis; on the basis of the percentage area it is possible to know the coupling efficiency of a polymer by the relation:

% Area $(SI)_n$–X/% Total Area

The coupling efficiency in the known art is typically between 80 and 95%. If the coupling efficiency is too low (for example less than 50%), the holding power is insufficient for the required uses.

The coupling efficiency can be controlled on a synthesis level by a reduction of the coupling agent with respect to the stoichiometric quantity or by prematurely deactivating a part of the active centres and subsequently coupling.

Having described the general aspects of this invention, the following specific examples have the only purpose of illustrating some of the details but should in no way be considered as limiting.

All the compositions and percentages indicated, unless otherwise specified, are expressed by weight, whereas the block copolymers mentioned in the examples have a coupling efficiency of between 75 and 95%.

SYNTHESIS OF THE RADIAL BLOCK COPOLYMERS (I)

In the specific case of copolymers with three radial blocks, reference is made to Italian patent application IT 93A00879.

The synthesis of copolymers with four radial blocks is very similar in that only the coupling agent changes. We are in any case including hereunder an example of this synthesis.

700 g of cyclohexane containing 100 ppm of THF and 25 g of styrene monomer are fed into a two-liter stainless steel reactor, equipped with a thermostatic jacket and stirring system.

The mixture is heated to 50° C. and 0.12 g of N-butyl-lithium in a hexane solution are added. After 25'of reaction the temperature is brought to 55° C. A sample of solution taken and analyzed showed the complete conversion of the styrene. 75 g of butadiene were then added and the mixture was left to react for 25' until the complete conversion of the second monomer. The temperature of the mixture was 90° C.

In this way a two-block copolymer of styrene-butadiene (S-B) was obtained, which was subjected to coupling to form a radial polymer with 4 branches. 0.08 g of silicon tetrachloride in a solution of cyclohexane at 5% by weight were then added to the solution containing the block polymer and maintained at 90° C., and the mixture was left to react for 10' at the same temperature.

The polymeric solution was discharged from the reactor and 0.5 g of BHT (2,6-ditert-butyl-paracresol) and 1 g of TNPP (trinonyl-phenylphosphite) were added as antioxidant.

The solvent was then eliminated by distillation in a vapour stream and the radial copolymer was dried for 12 hours in an oven under vacuum at 60°.C.

Analysis by Gel Permeation Chromatography (GPC) in tetrahydrofuran (THF) indicates a weight average molecular weight $PM_w$=210,000 whereas the S-B copolymer before coupling had shown a weight average molecular weight $PM_w$=60,500. The molecular weight of the styrene block, also measured by GPC, proved to be 15,500. The total content of polystyrene in the block copolymer therefore amounts to 25% by weight determined by FT-IR. The coupling efficiency is equal to 87%; this was defined as the area relating to the chromatographic peak of the non-coupled type in relation to the total area.

Example 2. PREPARATION AND CHARACTERIZATION OF THE BLENDS.

Using the block copolymers whose synthesis is described above, adhesive compositions were prepared by blending the various components in a Werner SIGMA BLADE-type mixer at a temperature of 140° C. and for a time of about 50 minutes.

The compositions contain: 100 g of radial copolymer, 120 g of tackifier consisting of aliphatic hydrocarbon resins and 30 g of napthenic oil.

1 gram of a phenolic antioxidant (Irganox 1010 of Ciba Geigy) was also added to the two formulations. 30 g of each of the compositions thus prepared, dissolved in 100 g of toluene, are spread on a polyester film and dried at 120° C. for 3 minutes obtaining a thickness of 30 microns. The adhesive and cohesive characteristics of these compositions were measured with the following methods:

180° Peel Adhesion (PSTC 1):
    adhesive capacity on steel by peeling at 180°, measured in g/2.5 cm and determined according to regulation PSTC 1;

Rolling Ball Tack (astm d 3121):
    Dynamic adhesive capacity measured according to regulation ASTM D 3121;

Probe Tack Test (ASTM D 2979/71):
    Adhesive capacity measured according to regulation ASTM D 2979/71;

Quick Stick (PSTC 5):
    Adhesive capacity measured on steel and Kraft paper according to regulation PSTC 5;

Holding Power (PSTC 7 mod.):
    Cohesive capacity measured on steel and Kraft paper according to regulation PSTC 7 mod.

The results of the tests are shown in table 1.

The comparative formulation is based on linear S—I—S polymer alone and is found in mixture no. 2, whereas the formulations of mixtures 1, 3, 4, 5 and 6 differ by the different ratios between the polymers (I), (II) and (III).

to have intermediate characteristics and a balance of adhesive/cohesive properties such as to permit a selection among more than one formulation depending on the characteristics required; it is typical that the adhesion values grow with the quantity of SIS polymer.

We claim:

1. Hot melt adhesive compositions based on radial block copolymers of styrene with butadiene and radial and/or linear block copolymers of styrene with isoprene containing:

a) from 15 to 50% by weight of a radial block copolymer with four branches and having the formula:

$$(S—B—)_4—X \qquad (I)$$

wherein B corresponds to the polybutadiene block, S corresponds to the polystyrene block and X is the residue of a tetravalent coupling agent, b) from 0 to 35 % by weight of a radial block copolymer having the formula, $$(S—I—)_3—X \qquad (II)$$

wherein I corresponds to the polyisoprene block whereas S corresponds to the polystyrene block, c) from 8 to 35 % by weight of a linear block copolymer having the formula, $$S—I—S \qquad (III)$$

TABLE 1

| | | 1 | 2 | 3 | 4 | 5 | 6 |
|---|---|---|---|---|---|---|---|
| FORMULATIONS | | | | | | | |
| POLYMER I | % | 40 | — | 32 | 20 | 9.2 | 9.2 |
| POLYMER II | " | — | — | — | — | — | 30.8 |
| POLYMER III | " | — | 40 | 8 | 20 | 30.8 | — |
| ADHESION PROMOTING RESINS | " | 50 | 50 | 50 | 50 | 50 | 50 |
| PLASTICIZERS | " | 9.6 | 9.6 | 9.6 | 9.6 | 9.6 | 9.6 |
| ANTIOXIDANTS | " | 0.4 | 0.4 | 0.4 | 0.4 | 0.4 | 0.4 |
| CHARACTERISTICS OF ADHESIVE FILM | | | | | | | |
| 180° PEEL ADHESION | N/2.5 cm | 8.5 | 16.5 | 8.8 | 10.6 | 14.3 | 13.6 |
| QUICK STICK | " | 2.1 | 6 | 3.4 | 3.8 | 5 | 5.2 |
| PROBE TACK TEST | g | 725 | 825 | 670 | 610 | 875 | 800 |
| ROLLING BALL TACK | cm | 3.6 | 5 | 1.2 | 4.8 | 2.9 | 3 |
| SHEAR ADHESION (HOLDING POWER) | h | 94 | 70 | 65 | 68 | 68 | 63 |
| CHARACTERISTICS OF ADHESIVE FILM AFTER AGING* | | | | | | | |
| 180° PEEL ADHESION | N/2.5 cm | 7.4 | 14.2 | 7.8 | 10.5 | 13.6 | 13 |
| QUICK STICK | " | 1.7 | 5 | 2.7 | 3.4 | 4.7 | 4.7 |
| PROBE TACK TEST | g | 620 | 800 | 565 | 595 | 720 | 660 |
| ROLLING BALL TACK | cm | 1.7 | 6 | 1.2 | 6 | 4 | 4.1 |
| SHEAR ADHESION (HOLDING POWER) | h | 48 | 28 | 32 | 36 | 33 | 30 |

* = 72 hrs at 60° C. - 50% Relative humidity

From table 1 it can be seen that formulation No. 2, based on the linear S—I—S copolymer, proves to have values of 180° Peel Adhesion and Quick Stick which are too high, both on the film evaluated after preparation, and on the film evaluated after aging.

On the contrary, formulation 1, based on the radial S—B—S polymer, proves to have lower values of Peel Adhesion and Quick Stick, both on the film as such and after aging whereas the other values relating to the adhesion characteristics (Probe Tack Test and Rolling Ball Tack) prove to be similar to those of formulation 2.

Formulations 3, 4, 5 and 6, containing blends of radial SBS polymers and linear and/or radial SIS polymers, prove d) from 35 to 80% by weight of at least one adhesion-promoting resin, e) from 0 to 30% by weight of at least one plasticizing oil, f) from 0 to 1% by weight of at least one antioxidant, these compositions being characterized in that, (i) the total content of polystyrene in the block copolymer (I) is less than 40% by weight, (ii) the total content of polystyrene in the block copolymer (II) is less than 35% by weight, (iii) the total content of polystyrene in the linear block copolymer (III) is less than 40% by weight, (iv) the molecular weight of the polystyrene blocks in copolymer (I) is less than 30,000, that of the polystyrene blocks in copolymer (II) is less than 32,000 whereas that of the polystyrene blocks in copolymer (III) is less than 36,000,
(v) the molecular weight of the radial block copolymer (I) (S—B—)$_4$—X is between 180,000 and 260,000,
(vi) the molecular weight of the radial block copolymer (II) (S—I—)$_3$—X is between 120,000 and 180,000,
(vii) the molecular weight of the linear block copolymer SIS (III) is between 70,000 and 180,000.

2. Hot melt adhesive compositions based on radial block copolymers of styrene with butadiene and radial and/or linear block copolymers of styrene with isoprene containing:
a) 20% by weight of a radial block copolymer with four branches and corresponding to the formula, (S—B—)$_4$—X  (I)

wherein B is a polybutadiene block, S is a polystyrene block and X is the residue of a tetravalent coupling agent,
c) 20% by weight of a linear block copolymer corresponding to the formula,

S—I—S  (III)

wherein I is a polyisoprene block and S is a polystyrene block,
d) 50% by weight of at least one adhesion-promoting resin,
e) 9.6% by weight of at least one plasticizing oil, and
f) 0.4% by weight of antioxidant.

3. Hot melt adhesive compositions based on radial block copolymers of styrene with butadiene and radial and/or linear block copolymers of styrene with isoprene, containing:
a) 32% by weight of a radial block copolymer with four branches and corresponding to the formula, (S—B—)$_4$—X  (I)

wherein B is a polybutadiene block, S is a polystyrene block and X is the residue of a tetravalent coupling agent,
b) 8% by weight of a radial block copolymer corresponding to the formula, (S—I—)$_3$—X  (II)

wherein I is a polyisoprene block and S is a polystyrene block and X is the residue of a tetravalent coupling agent,
d) 50% by weight of at least one adhesion-promoting resin,
e) 9.6% by weight of at least one plasticizing oil, and
f) 0.4% by weight of at least one antioxidant.

* * * * *